UNITED STATES PATENT OFFICE.

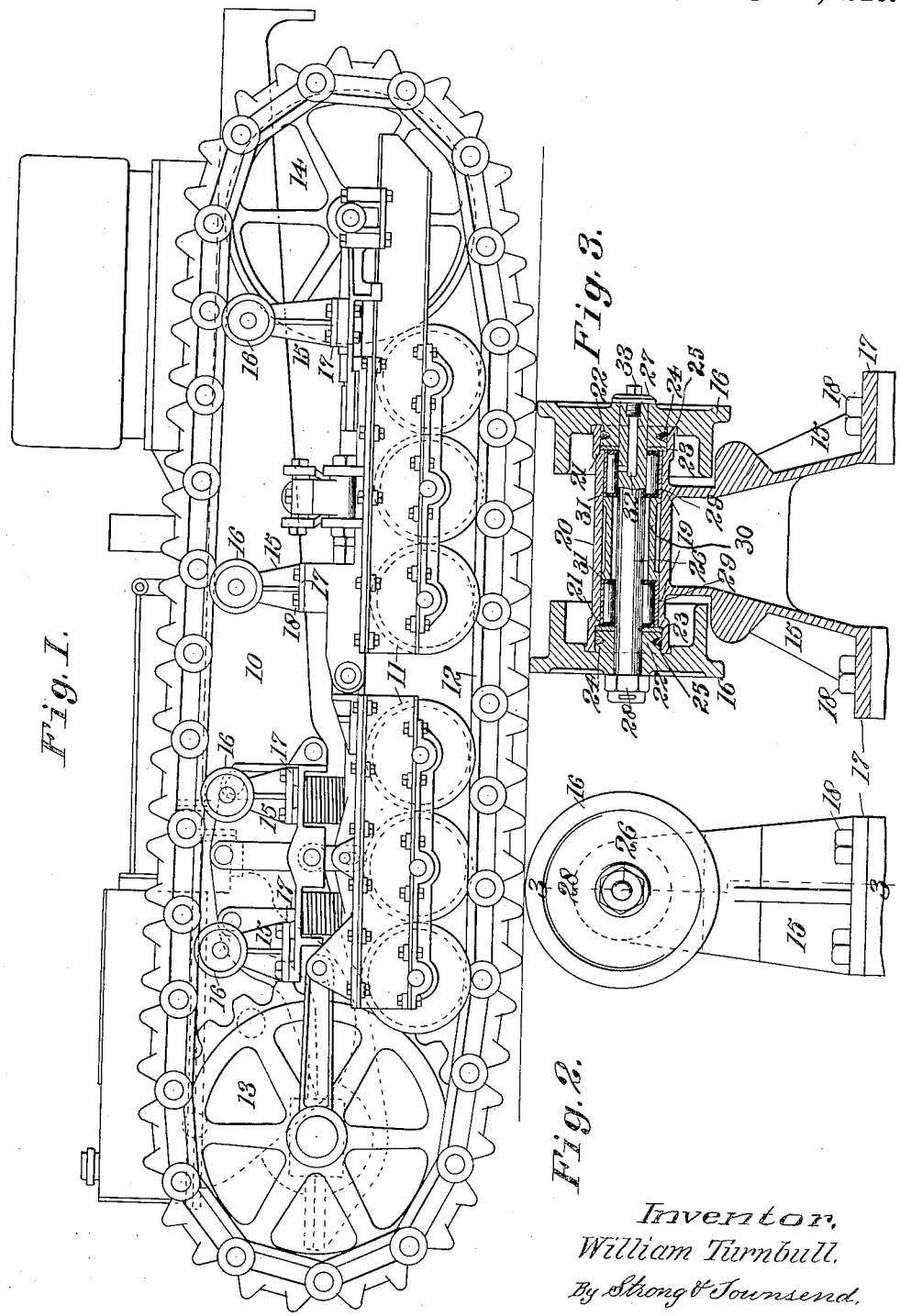

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

TRACK-SUPPORT FOR CHAIN-TRACK TRACTORS.

1,336,871.     Specification of Letters Patent.    Patented Apr. 13, 1920.

Application filed May 25, 1918. Serial No. 236,526.

*To all whom it may concern:*

Be it known that I, WILLIAM TURNBULL, a citizen of the United States, residing at Peoria, in the county of Peoria and State of Illinois, have invented new and useful Improvements in Track-Supports for Chain-Track Tractors, of which the following is a specification.

This invention relates to chain track tractors, and more particularly to means for mounting either the supporting and guiding rollers for the upper run of the chain tracks of such vehicles, or the rollers resting upon the ground run of the tracks.

As is well known, the endless chain tracks employed on tractors of the type here involved are automatically deposited on the ground in front of the tractor and picked up at the rear thereof after having been traveled over by the roller truck or other means upon which the tractor is supported. During this operation those portions of the track which have been on the ground and have usually become covered with mud or sand, are successively carried forward in the upper run of the track in an inverted position, thus discharging the accumulated material upon whatever means are employed to support the upper run of the track, with the result that these supporting means are soon worn out. Similarly, the rollers traveling over the ground run of the track, being close to the ground, are often covered with dust or sand which works into their bearings and soon wears them out.

The principal object of the present invention is to overcome these difficulties by providing track engaging means of this sort in which the roller and its supporting member are so constructed and assembled that the roller will be arranged to withstand side thrusts, and yet have its horizontal and thrust bearings kept practically free from grit or other foreign matter.

In carrying out these objects a bracket is secured on either side of the roller truck of a self-laying track tractor and provided with a bearing head having a cylindrical opening extending through it. This opening is arranged at right angles to the direction in which the track travels and is provided at each end with a counterbore, into which the hubs of a pair of flanged track-carrying or load-supporting rollers fit. The rollers are secured together and supported upon a spindle extending through them and the cylindrical opening in the bearing head, roller bearings being provided interiorly of said head to support the spindle.

One form which my invention may assume is exemplified in the following description and illustrated in the accompanying drawings, in which—

Figure 1 is a side elevation of a chain track tractor illustrating one application of the invention.

Fig. 2 is a detail elevational view of the invention.

Fig. 3 is a cross-sectional view on the line 3—3 of Fig. 2.

The tractor illustrated in the drawings comprises a main frame 10, supported upon a roller truck mechanism 11 which in turn is supported upon an endless chain track 12 at either side of the machine trained over track driving and carrying wheels 13 and 14.

To support the upper run of track 12 and prevent it from flapping from side to side, supporting brackets 15, fitted with flanged rollers 16, are provided. For the sake of brevity the invention will be described only as applied to these track supporting means, although it could obviously be applied to the track engaging means of the truck mechanism 11 as well. As best shown in Fig. 3, the brackets 15 are provided at their lower ends with lugs 17 to receive fastening bolts 18, the upper end of each bracket being formed with a transversely extending head 19. This head is formed with a cylindrical opening 20 extending through it from end to end, the ends of this opening 20 being counter-bored to form shoulders, as shown at 21. Into the recesses thus formed are fitted the hubs 22 of rollers 16, the ends of these hubs abutting against thrust washers 23 fitting against shoulders 21. The outer sides of the hubs 22 are provided with grooves into which are fitted oil and dust-proof felt washers 24 which serve to prevent admission of foreign matter to the bearing.

To further protect the bearing against the admission of injurious materials a groove 25 is cut into each roller 16 at the base of the hubs 22 in a manner to permit the ends of the bearing head to extend a short distance into the rollers, as shown in Fig. 3.

This overlapping construction renders it practically impossible for dust or sand discharged upon the roller support to find its way either to the thrust bearing or the horizontal bearing.

The flanged rollers 16 are supported upon and held together in proper position by a spindle 26 extending through each roller and through the opening 20 in the bearing head, one end of the spindle 26 having a head 27 and the other a nut 28, by means of which the rollers 16 may be secured together and brought into proper adjustment relatively to the thrust washers 23.

The spindle 26, upon which rollers 16 are carried, is supported within the bearing head upon two sets of roller bearings 29. These bearings are held in proper position within the space 20 by means of a spacer 30, the ends of which abut against the cages 31 of the bearings. The outer ends of the cages 31 are flush with shoulders 21 and abut against the inner sides of the thrust washers 23. It will thus be apparent that the whole device may be assembled at one operation by inserting the bolt-like spindle 26 through the proper parts and tightening the nut 28 the required amount.

Lubrication is applied to the bearing by forcing grease through a duct 32 formed in the head end of the spindle 26 and provided with a plug 33.

Having thus described my invention, what I claim and desire to secure by Letters Patent is—

1. The combination with a tractor having endless self-laying tracks, of track engaging means comprising a bracket having a tubular bearing head, supporting rollers fitting over the ends of said bearing head, hubs on said rollers extending into said tubular bearing head, and a spindle journaled in the bearing head to support said rollers and secure them together and anti-friction means carried by the bracket head on which the spindle is turnable.

2. The combination with a tractor having endless self-laying tracks, of track engaging means comprising a bracket having a tubular bearing head, supporting rollers provided with an annular groove to receive the ends of said bearing head, hubs on said rollers extending into said tubular bearing head, packing means between the hubs and bearing head to exclude foreign matter, and a spindle journaled in the bearing head to support said rollers and secure them together.

3. The combination with a tractor having endless self-laying tracks, of track engaging means comprising a bracket having a tubular bearing head, thrust washers secured within said head near the ends thereof, supporting rollers fitting over the ends of said bearing head, hubs on said rollers extending into said tubular bearing head, and a spindle journaled in the bearing head to support said rollers and secure them together.

4. The combination with a tractor having endless self-laying tracks, of track engaging means comprising a bracket having a tubular bearing head, supporting rollers fitting over the ends of said bearing head, hubs on said rollers extending into said tubular bearing head, oil-retaining means carried on the exterior of said hubs, and a spindle journaled in the bearing head to support said rollers and secure them together.

5. The combination with a tractor having endless self-laying tracks, of track engaging means comprising a bracket having a tubular bearing head, thrust washers secured within said head near the ends thereof, supporting rollers fitting over the ends of said bearing head, hubs on said rollers extending into said tubular bearing head, a spindle journaled in the bearing head to support said rollers and secure them together, and roller bearings interposed between the spindle and the bearing head, said bearings being spaced apart and held in position by means of the thrust washers.

6. The combination with a tractor having endless self-laying tracks, of track engaging means comprising a bracket having a tubular bearing head, shoulders formed within and near the ends of said head, thrust washers fitted against said shoulders, supporting rollers fitting over the ends of said bearing head, hubs on said rollers extending into said tubular bearing head, and a spindle journaled in the bearing head to support said rollers and secure them together.

In testimony whereof I have hereunto set my hand in the presence of two subscribing witnesses.

WILLIAM TURNBULL.

Witnesses:
 EMIL F. HOWLINS,
 H. B. BAKER.